March 7, 1944.    J. S. SHARPE    2,343,333
MECHANICAL DEVICE
Filed Nov. 3, 1942
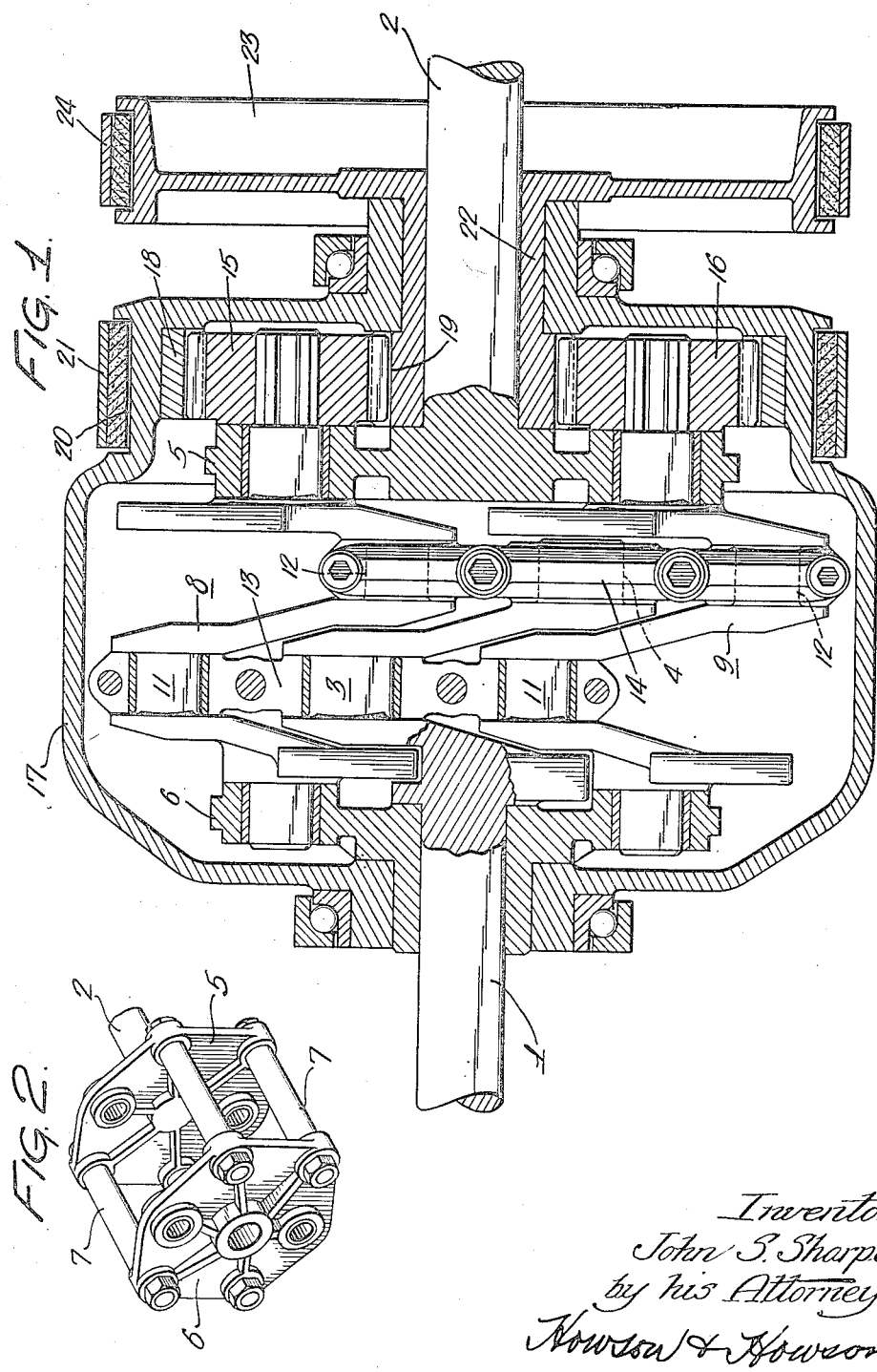
Inventor:
John S. Sharpe
by his Attorneys
Howson & Howson Patented Mar. 7, 1944

2,343,333

UNITED STATES PATENT OFFICE 2,343,333

MECHANICAL DEVICE

John S. Sharpe, Haverford, Pa.

Application November 3, 1942, Serial No. 464,377

6 Claims. (Cl. 74—269)

A principal object of this invention is to provide a new mechanical movement of advantage, for example, in the production of reversing gears for power transmissions.

Another and more specific object of the invention is to provide a combined reversing and reduction gear unit characterized by relative simplicity of form, compactness, ruggedness, and flexibility of regulation in respect to the speed reduction factor.

The invention further resides in certain structural and mechanical details and combinations hereinafter described and illustrated in the attached drawing wherein:

Fig. 1 is an axial sectional view of a gear unit incorporating my invention, and Fig. 2 is a detached view in perspective of one of the elements of the device.

With reference to the drawing, the device comprises driving and driven members in the form respectively of coaxial shafts 1 and 2. The inner end of the shaft 1 is provided, in the present instance, with a pair of cranks, 3 and 4 respectively, which are offset to diametrically opposite sides of the shaft axis and are, therefore, symmetrically disposed about the latter. The proximate end of the shaft 2 carries the structure illustrated in Fig. 2, such structure comprising essentially a pair of spaced flanges, 5 and 6 respectively, which are rigidly connected by tie rods 7. Journaled in this structure at diametrical opposite sides of shaft 1, are two multiple crank members 8 and 9 each of which comprises a pair of cranks 11 and 12 separated by angles of 180 degrees and having the same throw as the cranks 3 and 4 of the shaft 1. The crank 3 of the shaft 1 is connected with the crank 11 of both of the crank members 8 and 9 by means of a rigid link 13; and a corresponding link 14 connects the crank 4 of the shaft 1 with the cranks 12 of the members 8 and 9. Each of the members 8 and 9 carries at one end a pinion, 15 and 16 respectively, these pinions forming the planetary elements of a planetary system hereinafter described.

Embracing the proximate ends of the shafts 1 and 2 and the multiple crank structure described above, is a rotary housing 17 and this housing has, on the inside, an internal gear 18 with which the planetary elements 15 mesh and which constitutes the orbit member of the planetary system. Journaled on the shaft 2 is a gear 19 which meshes with the planetary elements 15 and 16 and constitutes the sun element of the planetary system. The housing 17, with the internal gear 18, and the sun gear 19 are capable of rotation with respect to the shafts 1 and 2 and also with respect to each other.

Means is provided for selectively immobilizing the orbit gear 18 and the sun gear 19. Thus the housing 17, to which the orbit gear 18 is connected, is provided with a brake drum 20 and a coactive band 21, the latter being operative, by means not shown, to hold the housing stationary, the housing being free to rotate about the axis of the shafts 1 and 2 when the brake band 21 is released. The sun gear 19 is connected to a sleeve 22 which carries, at its outer end, a brake drum 23, said drum having an associated brake band 24. This band, which may be independently manipulated by means not shown, functions, when tightened on the drum, to hold the sun gear 19 stationary, and when released leaves the sun gear free for rotation.

The operation of the aforedescribed device is as follows: When the brake band 24 is tightened on the drum 23 and the brake band 21 is released, rotation of the shaft 1 is transmitted to the shaft 2 in a forward direction and with a speed reduction of 2 to 1. In this case, the sun gear 19 acts as a fixed reaction member for the planetary elements 15 and 16. When the brake band 24 is released and the band 21 tightened on the casing 17 so as to immobilize the latter, the orbit gear 18 then acts as a reaction member for the planetary elements and causes the shaft 2 to be driven in a direction reverse to the direction of the shaft 1 and at a reduced speed in the ratio of two revolutions of the shaft 1 to one revolution of the shaft 2. The speed ratio between the driving and driven shafts may be modified by changing the relative diameters of the gears of the planetary system. This can be done without changing the radial distance of the axes of the planetary elements from the common axis of the shafts 1 and 2 and without, therefore, any modification of the internal structure of the unit with the exception of the gears themselves. The unit may be so constructed as to render substitution of different sets of gears an extremely simple operation, entailing no dismantling of the unit as a whole.

It is to be noted also that the arrangement is such as to permit a shift from forward to reverse by manipulation solely of the two brake bands 21 and 24 and without necessity for shifting of gears or clutches. While this may entail a relatively rapid wear upon the brake bands, it is apparent that the wear may be compensated by simple adjustment of the bands and while the unit is in operation, and that when the bands become worn beyond utility, the substitution of new bands may be effected rapidly and without the requirement for any major disassembling operation.

It will be understood that there may be some modification in the device without departure from the invention. It may be desirable in some cases, for example, to employ other than two cranks on the shaft 1 and on the other crank members, although it is desirable where a plurality of such cranks are employed that they be symmetrically distributed around the respective axes.

I claim:

1. In a mechanical movement, coaxial driving and driven members; a planetary system comprising rotary orbit and sun elements coaxial with said members, and a planetary element journaled eccentrically on one of said members and having a driving connection with the other member, said driving connection affording equal speeds of rotation for said other member and the planetary element; and means for selectively immobilizing said orbit and sun elements.

2. In a mechanical movement, coaxial driving and driven shafts; a coaxial planetary system comprising orbit and sun gears rotatable with respect to the shafts and to each other, and a planetary gear journaled eccentrically on one of the shafts and having a driving connection with the other shaft, said driving connection affording equal speeds of rotation for said other shaft and the planetary gear; and means for selectively immobilizing the orbit and sun gears.

3. In a mechanical movement, coaxial driving and driven shafts; a coaxial planetary system comprising orbit and sun gears rotatable with respect to the shafts and to each other, and a planetary gear journaled eccentrically on one of the shafts; a crank on the other of said shafts; a crank connected to the planetary gear; means for operatively connecting said cranks, and means for selectively immobilizing the orbit and sun gears.

4. In a mechanical movement, coaxial driving and driven shafts; a coaxial planetary system comprising orbit and sun gears rotatable with respect to the shafts and to each other, and a planetary gear journaled eccentrically on one of the shafts; a plurality of cranks on the other of said shafts angularly offset with respect to each other; a plurality of cranks connected with the planetary element and correspondingly offset about the axis of the element; means for connecting the cranks of said shaft respectively with the corresponding cranks; and means for selectively immobilizing said orbit and sun gears.

5. In a mechanical movement, coaxial driving and driven shafts; a coaxial planetary system comprising orbit and sun gears rotatable with respect to the shafts and to each other, and a planetary gear journaled eccentrically on one of said shafts; a plurality of cranks on the other of said shafts symmetrically distributed about the axis of the shafts; a plurality of cranks connected with the planetary element and correspondingly symmetrically distributed about the axis of the element; means for connecting the cranks of the shaft respectively with the corresponding cranks of the planetary element; and means for selectively immobilizing the orbit and sun gears.

6. In a mechanical movement, coaxial driving and driven shafts; a coaxial planetary system comprising orbit and sun gears rotatable with respect to the shafts and to each other, and a plurality of planetary gears journaled eccentrically one one of the shafts; a plurality of cranks on the other of said shafts angularly offset with respect to each other; a plurality of cranks connected with each of the planetary elements and correspondingly angularly offset about the axis of the element; means for connecting the cranks of said shaft respectively with the corresponding cranks of the planetary elements; and means for selectively immobilizing the orbit and sun gears.

JOHN S. SHARPE.